United States Patent
Sylvester et al.

(10) Patent No.: US 7,021,811 B2
(45) Date of Patent: Apr. 4, 2006

(54) LIGHT DISTRIBUTION HUB

(75) Inventors: Gail M. Sylvester, Frankenmuth, MI (US); Raymond Lippmann, Howell, MI (US); Michael E. Fye, Kokomo, IN (US); Tim A. Kenworthy, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 139 days.

(21) Appl. No.: 10/461,097

(22) Filed: Jun. 13, 2003

(65) Prior Publication Data

US 2004/0252933 A1  Dec. 16, 2004

(51) Int. Cl.
F21V 3/04 (2006.01)

(52) U.S. Cl. ............ 362/583; 362/293; 362/310; 385/15

(58) Field of Classification Search ........ 362/583, 362/293, 308, 310, 311, 2, 1, 551, 555, 554, 362/565–568, 257, 296, 307; 385/15, 24, 385/31, 33–35, 53, 76, 86, 88, 89, 92, 93
See application file for complete search history.

(56) References Cited

U.S. PATENT DOCUMENTS

| | | | | |
|---|---|---|---|---|
| 1,642,187 A | * | 9/1927 | Young, Jr. | 362/574 |
| 3,131,690 A | * | 5/1964 | Innis et al. | 362/574 |
| 3,455,622 A | * | 7/1969 | Cooper | 362/293 |
| 3,564,231 A | * | 2/1971 | Bruce et al. | 385/88 |
| 3,624,385 A | * | 11/1971 | Wall | 385/88 |
| 3,727,043 A | * | 4/1973 | Wall | 362/565 |
| 4,097,917 A | * | 6/1978 | McCaslin | 362/565 |
| 4,329,737 A | * | 5/1982 | Triller et al. | 362/293 |
| 4,745,525 A | * | 5/1988 | Sheehy | 362/511 |
| 4,953,066 A | * | 8/1990 | Schiffer | 362/293 |
| 5,440,658 A | * | 8/1995 | Savage, Jr. | 385/88 |
| 5,548,676 A | * | 8/1996 | Savage, Jr. | 385/88 |
| 5,555,161 A | | 9/1996 | Roe et al. | 362/555 |
| 5,606,637 A | * | 2/1997 | Dolby | 362/565 |
| 5,695,269 A | | 12/1997 | Lippmann et al. | 362/27 |
| 5,700,077 A | * | 12/1997 | Dreyer et al. | 362/551 |
| 5,732,176 A | * | 3/1998 | Savage, Jr. | 385/88 |
| 5,799,124 A | * | 8/1998 | Zorn et al. | 385/125 |
| 6,106,162 A | | 8/2000 | Mrakovich et al. | 385/88 |
| 6,195,477 B1 | | 2/2001 | Denuto et al. | 385/15 |
| 6,799,901 B1 | * | 10/2004 | Yoshimura et al. | 385/88 |

* cited by examiner

Primary Examiner—Thomas M. Sember
Assistant Examiner—Ismael Negron
(74) Attorney, Agent, or Firm—Stefan V. Chmielewski

(57) ABSTRACT

A light distribution apparatus includes a light distribution hub and at least one light source a reference light wavelength emission. The light distribution hub includes color converter that is enclosed in a light house and converts the reference light wavelength emission to a converted light emission. The color converter is distributed through an aperture in the light house.

57 Claims, 13 Drawing Sheets

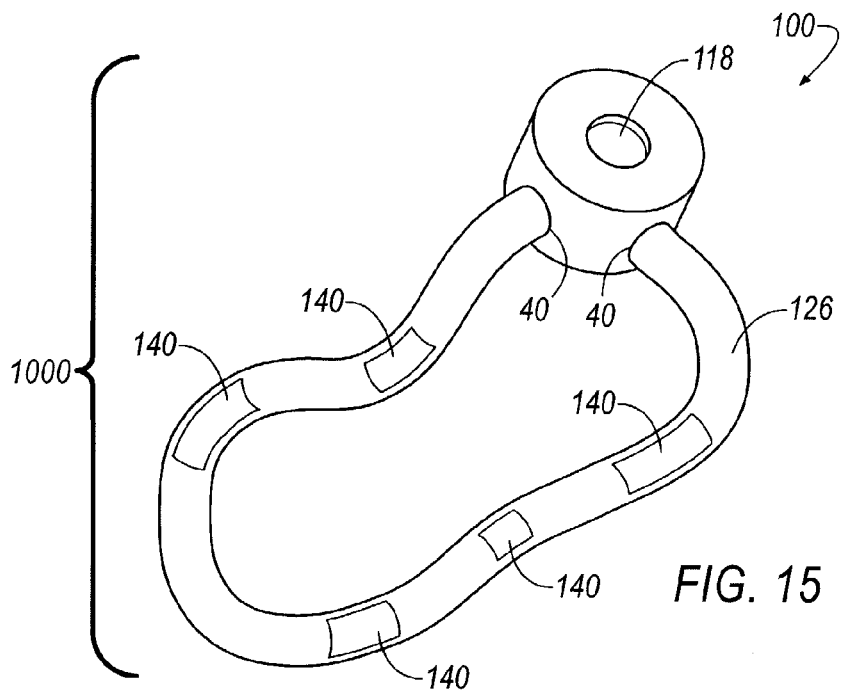
FIG. 15
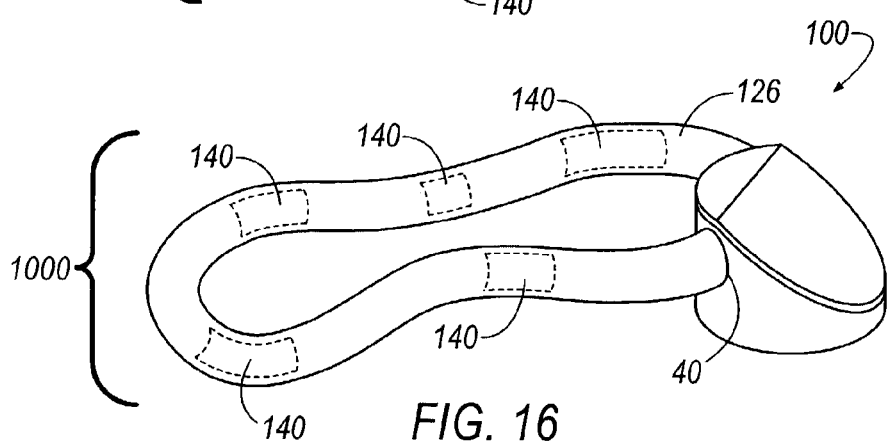
FIG. 16
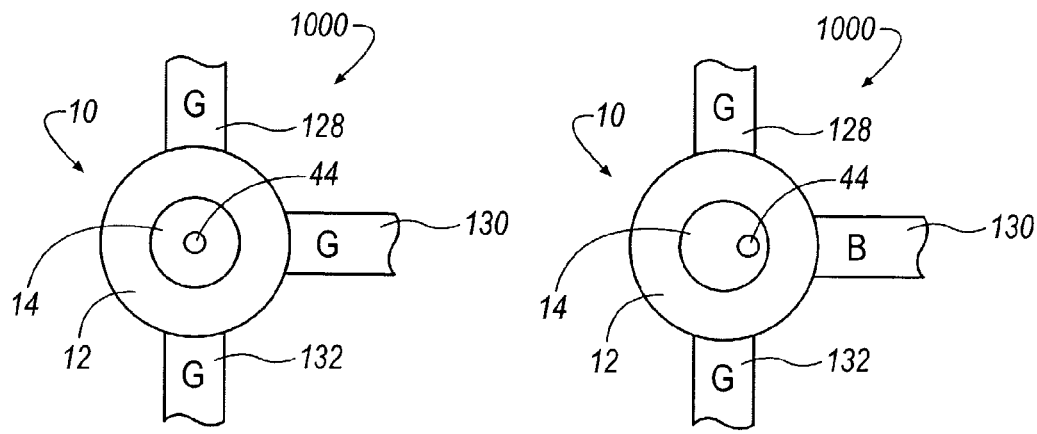
FIG. 18
FIG. 19

LIGHT DISTRIBUTION HUB

TECHNICAL FIELD

The present invention relates to back-lit displays. More specifically, the present invention relates to a back-lit display illuminated by a light distribution system including a light source, hub, and pipe.

BACKGROUND OF THE INVENTION

Conventional back-lit displays, such as those used in automotive audio, mobile multi media (MMM), and heating/ventilation/air-conditioning (HVAC) control heads, have been lit by a plethora of individual light sources such as miniature incandescent lamps or light emitting diodes (LEDs). Typically, for conventional design arrangements including a plurality of back-lit buttons, an individual LED is positioned behind an individual button to direct light towards a viewer. When individual light sources are used behind each button, the button typically includes a layer of diffusion to make a large button graphic appear even. To compensate for diffusion losses, a large amount light is directed at the back of the button. Not only is this design arrangement highly inefficient with respect to lighting utilization and the one-for-one arrangement of LED (or lamp)-to-button, but it also leads to several problems.

In a first example implementing incandescent lamps for light sources, between 80% and 90% of the electrical energy is undesirably converted to heat. To diminish the heat generation, costly solutions may include the relocation of components or the addition of heat sinking. In another example implementing LEDs for light sources, the light directed toward the viewer may undesirably vary. More specifically, undesirable color and intensity variation may occur from LED component to LED component. Because the viewer can distinguish the intensity and color variation within a batch of LEDs, these inherently undesirable characteristics of individual LEDs lead to color and intensity matching issues that have to be minimized prior to assembly of the back-lit display. Additional effort in minimizing these variables may call for matching sorted LEDs with specific resistors.

LED lighting for back-lit displays is also limited in color availability. Most LEDs are narrow spectrum light sources that, when observed by a viewer, are seen as highly saturated colors. If a desaturated or pastel color is desired, the color is typically produced by implementing a white LED with a filter placed directly over the LED or directly below the button. Although adequate for most applications, white LEDs are expensive, tend to have varying colors, and are inefficient to filter to certain colors. Alternatively, a desaturated or pastel color may also be produced by implementing a filtered incandescent lamp.

Thus, there is a need for an alternative device that may overcome the fallbacks of incandescent lamps or LEDs that illuminate back-lit displays.

SUMMARY OF THE INVENTION

In a first embodiment of the invention, a light distribution apparatus is described. The light distribution apparatus includes a light distribution hub and at least one light source. The light distribution hub includes a light house and a color converter. The light source provides reference color light wavelength emission. The light house is positioned over the light source to control and distribute the light wavelength emission from at least one aperture located about an outer perimeter of the light house. The color converter includes a bore that facilitates color conversion of the reference color light wavelength emission.

A second embodiment of the invention is a method of providing a low-loss distribution of light. In this embodiment, the method includes the steps of providing at least one light distribution hub including: providing a light distribution apparatus that includes a light house, positioning a color converter about a cavity in the light house, providing a bore in the color converter that facilitates color conversion of the reference color light emission, positioning the light house over at least one light source, providing a reference color light supplied from the at least one light source, emitting reference color light from the light source, converting the reference color light to a converted color light, and distributing and controlling the reference and converted light from at least one aperture located about an outer perimeter of the light house.

Various additional aspects and advantages of this invention will become apparent to those skilled in the art from the following detailed description of the preferred embodiment, when read in light of the accompanying drawings.

BRIEF DESCRIPTION OF THE DRAWINGS

FIG. 15 is a bottom-perspective view of a light distribution system according to one embodiment of the invention including the light hub illustrated in FIGS. 10–14;

FIG. 16 is a top-perspective view of a light distribution system according to another embodiment of the invention including the light distribution hub illustrated in FIGS. 10–14;

FIG. 18 is a top view of the light distribution hub illustrated in FIG. 17 including the color converter illustrated in FIG. 8A; and FIG. 19 is a top view of the light distribution hub illustrated in FIG. 17 including the color converter illustrated in FIG. 8B.

DETAILED DESCRIPTION OF THE PREFERRED EMBODIMENTS

As seen in FIGS. 1–2 and 10–11, the present invention includes a light distribution hub, which is shown generally at 10 and 100, respectively. The light distribution hubs 10, 100 provide a multitude of functions including light source emission control, light source emission distribution, and light source emission color conversion that provides the potential for multiple color generation from at least a single colored light source. As seen in FIGS. 15–19, the light distribution hub 10, 100 supplies light in a light distribution system 1000 for a back-lit device 1001.

Figure 1:
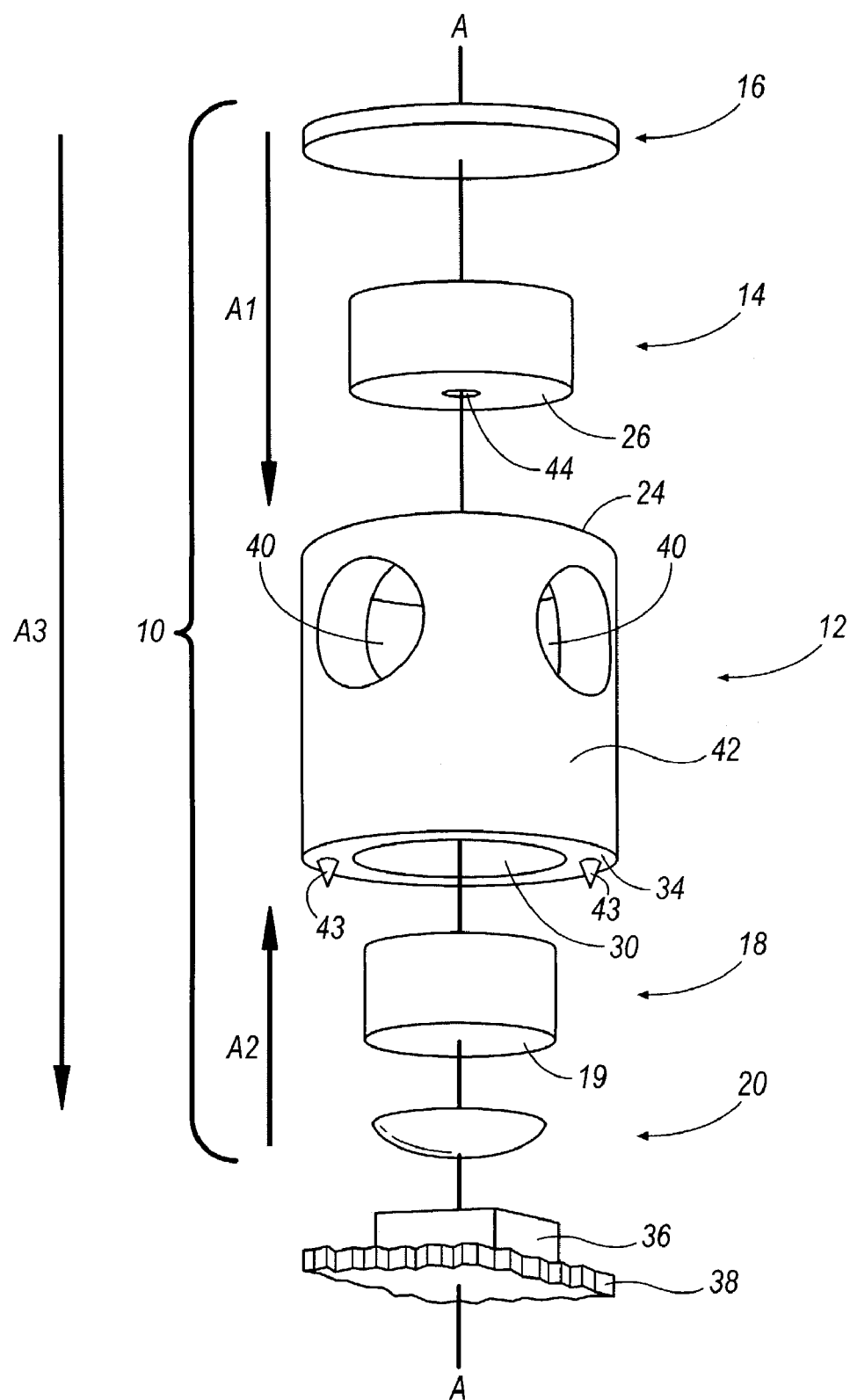
FIG. 1 is a bottom-perspective, exploded view of a light distribution hub according to one embodiment of the invention.
Figure 2:
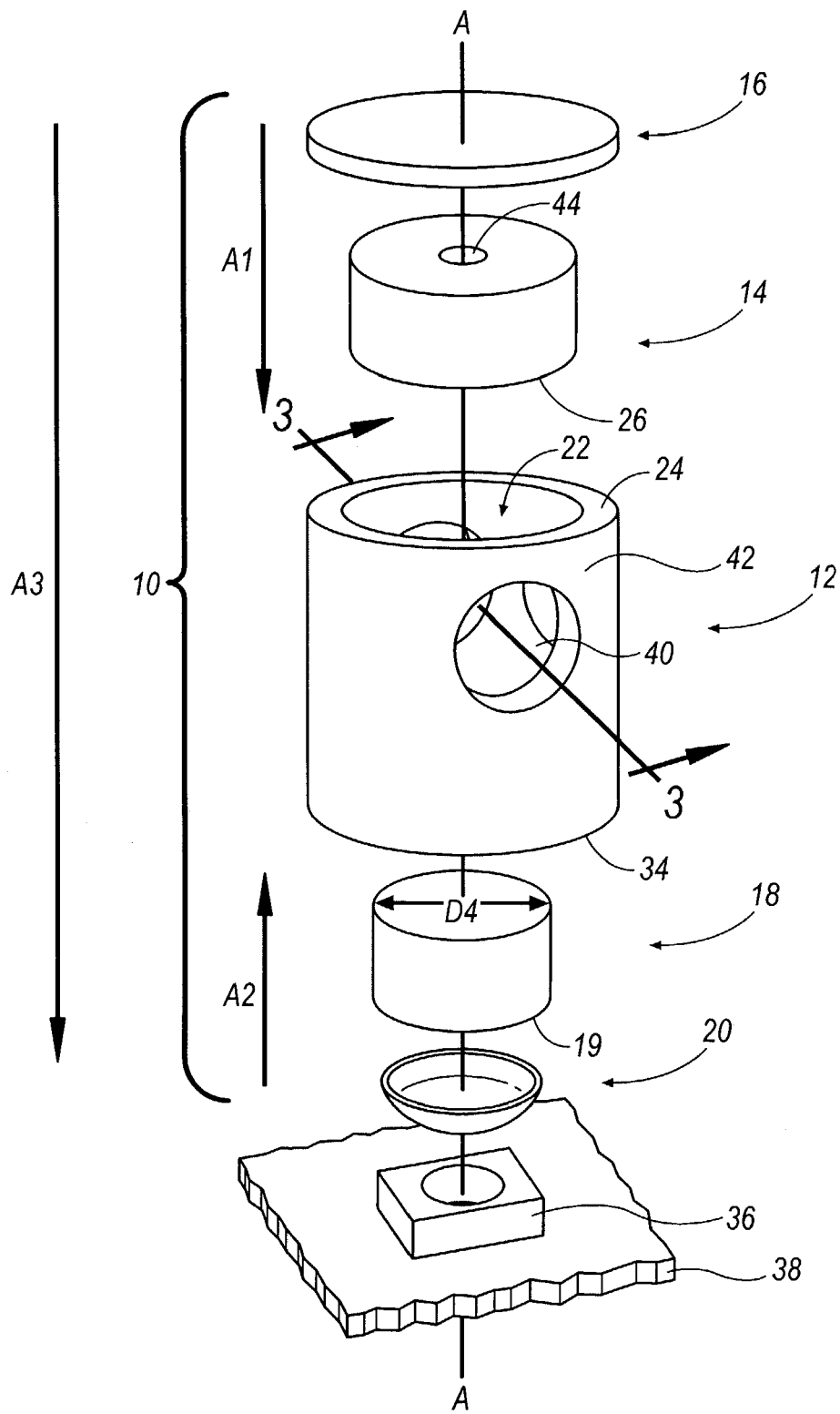
FIG. 2 is a top-perspective, exploded view of a light distribution hub according to FIG. 1.

Referring to FIGS. 1 and 2, the components comprising a first embodiment of the light distribution hub is shown in exploded form at 10, which may comprise any desirable height, H (FIG. 4), such as approximately 18 mm, that is not greater than the overall depth that the back-lit device 1001 permits. The light distribution hub 10 includes a light house 12, a color converter 14, and a cap 16. Alternative embodiments of the light distribution hub 10 may include an acrylic light pipe 18, which is hereinafter referred to as a "feeder pipe" 18, and a convex collimating lens 20. Although the convex collimating lens 20 is illustrated as a separate component, the feeder pipe 18 may be formed with a convex surface at an end 19 similar to the illustrated convex collimating lens 20.

Figure 5:
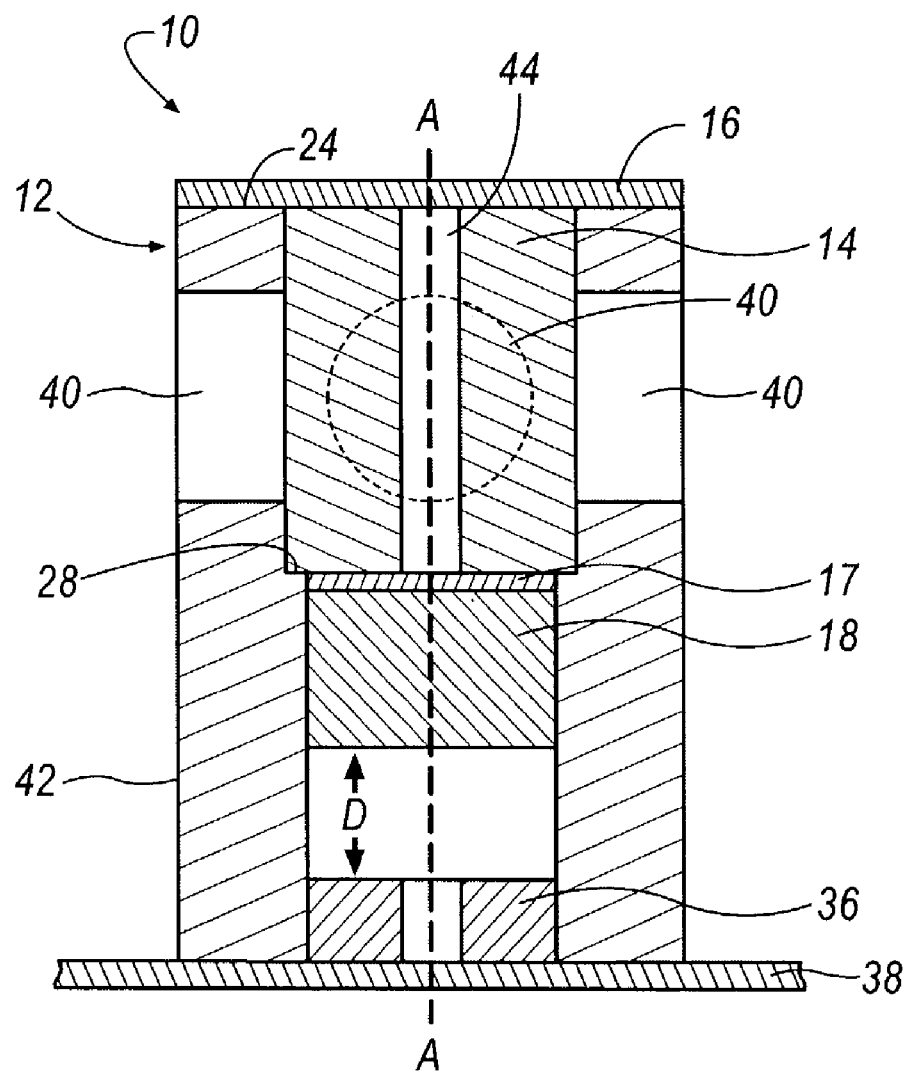
FIG. 5 is a cross-sectional view of the light distribution hub according to FIG. 4.

In a first assembly method, the light distribution hub 10 may be formed by first inserting the color converter 14 in the direction indicated by the arrow, A1, into a first cavity 22 (FIG. 2) that is cylindrical and extends axially about the axis, A, from an upper surface 24 of the light house 12. Full insertion of the color converter 14 is achieved when a bottom surface 26 of the color converter 14 contacts an inner bore perimeter 28 (FIGS. 3 and 5) of the light house 12 that defines a lower portion of the first cavity 22. After full insertion of the color converter 14, the cap 16 is secured to and placed over the upper surface 24 of the light house 12, fully sealing the opening of the light house 12, which is defined by the first cavity 22. Then, the optional feeder pipe 18 and an optional convex collimating lens 20 are inserted in the direction indicated by the arrow, A2, into a second cavity 30 (FIG. 1) of the light house 12.

Figure 4:
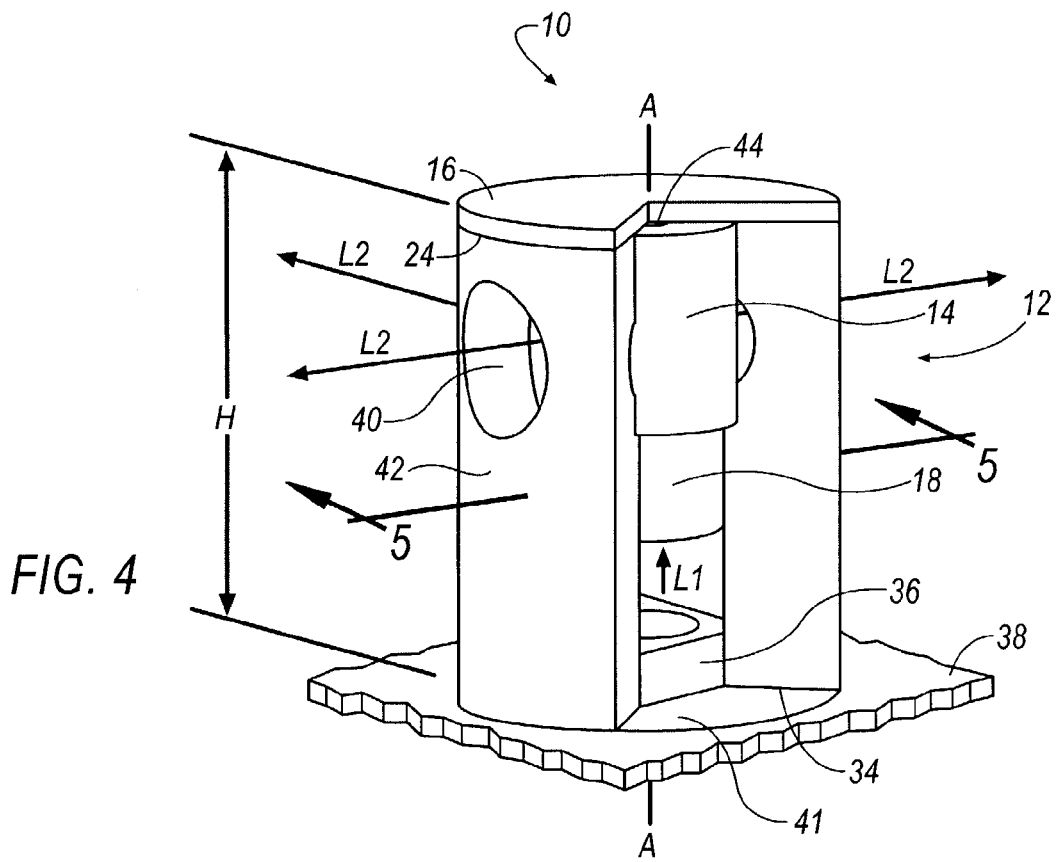
FIG. 4 is a perspective, partially cut-away, assembled view of the light distribution hub according to FIGS. 1 and 2.

The feeder pipe 18 may be implemented when the light distribution hub is designed to include a height, H, which essentially reduces the efficiency of the emitted light due to the extended travel of the light path across a greater distance from the light source to the back-lit display panel. It is desirable for the feeder pipe 18 to be positioned as close to the light source as possible; however, for purposes of illustration, the feeder pipe 18 is spaced from the light source to provide clearance for labeling indicia in the Figure. As seen in FIG. 4, the feeder pipe 18 may directly abut the color converter 14; alternatively, as seen more clearly in FIG. 5, the feeder pipe 18 and the color converter 14 may be nominally spaced by a transparent adhesive or an air gap, which is generally illustrated at 17.

Upon insertion of the feeder pipe 18, the bottom portion 32 (FIG. 3) of the second cavity 30, which is encompassed by a lower surface 34 of the light house 12, is positioned about a light source 36 in the direction indicated by the arrow, A3 (FIGS. 1 and 2) so that the light distribution hub 10 may be secured to a printed circuit board (PCB) 38. According to the illustrated embodiment, when the light distribution hub 10 is secured to the PCB 38 as described above, the feeder pipe 18 is spaced above the light source 36 by any desirable distance, D (FIG. 5), such as, for example, approximately 0.5 mm. It should be noted that light may be coupled into the feeder pipe more effectively by minimizing the dimension, D.

As seen in FIG. 4, the light source 36 is secured to the PCB 38 such that the lower surface 34 of the light house 12 is sealed against the PCB 38 in a tight relationship (e.g. within 0.001 mm) to prevent emitted light from the light source 36 and reflected color converted light off of the cap 16 (explained in greater detail below) from escaping the light distribution hub 10. To reduce light absorption by the PCB 38, a reflective film material 41 may be adhered to or painted over the region of the PCB 38 that the light house 12 occupies, such that the film 41 encompasses the plane of the PCB 38 about the light source 36. Optional attachment features, such as spears 43 (FIG. 1) may extend from the lower surface 34 of the light house 12 and 'bite' into the PCB 38 so as to provide additional gripping strength thereto. Alternatively, the spears 43 may extend from the PCB 38 (not shown) and 'bite' into the lower surface 34 of the light house 12 to achieve the same gripping effect.

Although the light distribution hub 10 described above is assembled by inserting the color converter 14 and the feeder pipe 18 in the cavities 22, 30, it is also contemplated that the assembly process may be obviated. The obviation of the insertion of the color converter 14 and feeder pipe 18 may be achieved in a second assembly process including the in-molding of the color converter 14 and feeder pipe 18 with a unitary cap and light house structure. According to the first assembly process described above, the light house 12 and cap 16 are separately formed components of the same material composition; in the second in-molded assembly process, the light house 12 and cap 16 are a one-piece unit that is molded about the color converter 14 and feeder pipe 18. Although the in-molding process reduces the number of parts and steps for forming the light distribution hub 10, the in-molding process must consider molding around apertures in the light house 12, which are referred to below at reference numeral 40, as well as a bore in the color converter 14, which is seen generally at 44.

Figure 3:
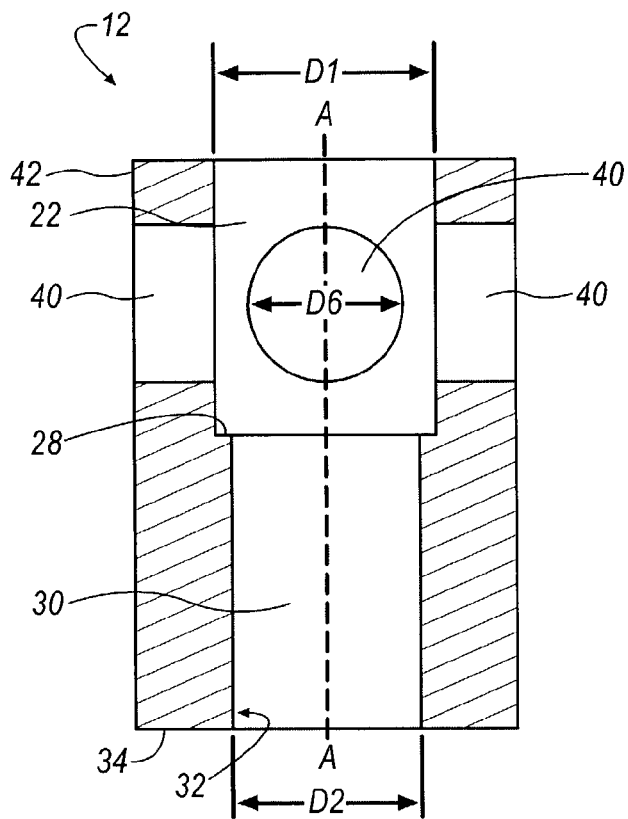
FIG. 3 is a cross-sectional view of a light house according to FIG. 2.

As seen in FIG. 3, the second cavity 30 extends axially about the axis, A, from the lower surface 34 of the light house 12 towards and into the first cavity 22. As illustrated, the first cavity 22 includes a first diameter, D1, that is greater than a second diameter, D2, of the second cavity 30. Accordingly, for reasons explained below, the color converter 14, which is inserted into the first cavity 22, includes a third diameter, D3 (FIG. 8A), which is greater than a fourth diameter, D4 (FIG. 2), of the feeder pipe 18. The diameters D1–D4 may comprise any desirable diameter such as, for example, 5.56 mm, 4.75 mm, 5.46 mm, and 4.749 mm, respectively. Although light house 12 is illustrated as being generally cylindrical, the light house 12 may comprise any desirable aesthetic shape for accommodating depth restrictions for a given back-lit component; however, as will be explained later in relation to FIGS. 10–14, the shape of the light house 12 may be altered for implementing a distinct functional difference than that provided for the light house described in FIGS. 1–5.

Functionally, the light house 12 illustrated in FIGS. 1–5 provides a low loss isotropic distribution of light. The low loss isotropic distribution provides an omni-directional, unlimited distribution of light from apertures 40 that extend radially from the axis, A, about the first cavity 22 through the outer perimeter 42 of the light house 12. The apertures 40 may be centrally disposed about the same plane, or, alternatively, the apertures 40 may by offset from each other in multiple planes. According to the illustrated embodiment in FIGS. 1–5, three apertures 40 are disposed about the perimeter 42 in the same plane; however, any desirable number of apertures may be included in the design of the light house, such as, for example, two, three, four, five, or more apertures 40 in the same or different planes.

Prior to emission of the isotropically distributed, color converted light, all of the unconverted light from the light source 36 and the converted light that passes through the color converter 14 is contained and internally reflected within the first and second cavities 22, 30 of the light house 12 that includes a generally opaque material. More specifically, the opaque material may be plastic or other suitable material comprising any reflective or light-colored material, that may be white, silver, or the like. A suitable material is polytetrafluoroethylene, optionally containing micro voids to enhance light scattering. If the plastic, material is not a completely opaque, an opaque, white, silver or any other reflective color may be coated, painted, or applied in any desirable method over the plastic. Essentially, the opaque material results in the 'recycling' of light that is not passed through the apertures 40 by constantly reflecting the light within the first and second cavity 22, 30 until the light exits the apertures 40. If desired, the light house 12 may comprise a partially-opaque material (i.e. a white, partially transparent material) that leaks light about the outer perimeter 42 of the light house 12 for other components located directly above or about the light distribution hub 10 on a back-lit panel.

Upon reflection of the light from the cavities 22, 30 including the opaque material, the apertures 40 enable low loss isotropic light distribution from the light house 12 in every direction except perpendicular to the light source 36. Because the apertures 40 are generally disposed about the area of the light house 12 including first cavity 22, the emitted light from the apertures 40 is isotropically distributed about a generally perpendicular plane from the apertures 40. However, if desired, the light may be distributed in a three-dimensional isotropic distribution if the first cavity 22 comprises a generally spherical shape (FIGS. 6A and 6B), that randomizes the light from the light source 36 so as to provide a uniform distribution from the apertures 40.

Figure 6A:
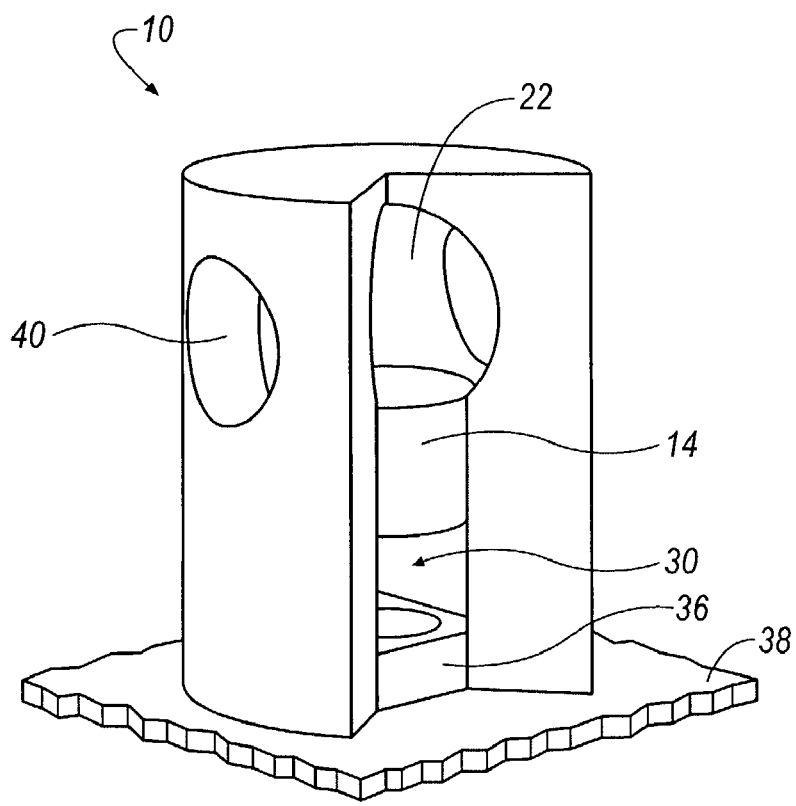
FIG. 6A is a perspective, partially cut-away, assembled view of a light distribution hub according to another embodiment of the invention including a spherical cavity with apertures located above a color converter.
Figure 6B:
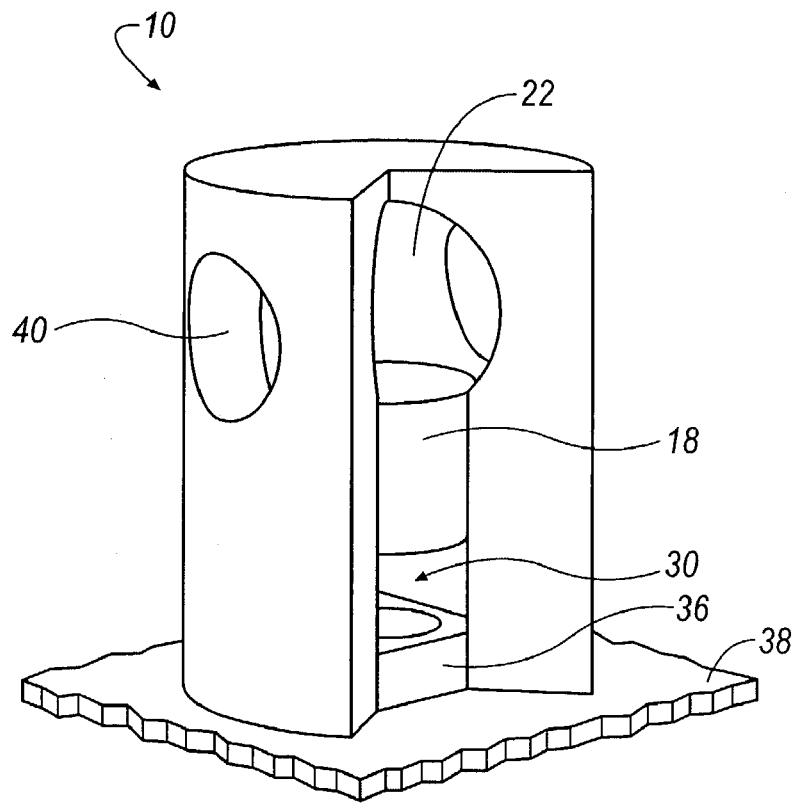
FIG. 6B is a perspective, partially cut-away, assembled view of a light distribution hub according to another embodiment of the invention including a spherical cavity with apertures located above a feeder pipe.

As seen in FIG. 6A, the color converter 14 does not occupy the first cavity 22, which includes the generally spherical shape, but rather, the area defined by the second cavity 30, which includes a general cylindrical shape; alternatively, the color converter 14 may include a spherical shape (FIG. 8H) and may occupy the first cavity area 22 (not shown). Because the feeder pipe 18 is optional, it is not illustrated in FIG. 6A; however, it is important to note that the feeder pipe 18 may be included in the design of the light distribution hub 10 in this particular embodiment of the invention. In an alternate embodiment as seen in FIG. 6B, the color converter 14 may be replaced by a light pipe 18; in this embodiment, the light house 12 essentially provides an isotropic distribution of light from the light source 36 without changing the color of the light source. Although not illustrated in reference to FIGS. 1–6B, it is contemplated that the first cavity 22 may include any desirable shape other than a cylinder or sphere resulting in a low loss isotropic distribution of light.

Referring to FIG. 4, the light distribution hub 10 receives light from the light source 36 in the direction of the arrow, L1, and provides an output of isotropic light in the direction of the arrows, L2. The light, in the direction of the arrow, L1, is emitted from the light source 36 is herein after referred to as a 'reference color.' The reference color may be, for example, a blue-colored light emitting diode (LED). The LED emits a spectrum of light energy with a peak of approximately 464 nanometers. This blue light excites the material of the color converter 14 in the light distribution hub 10, which absorbs high frequency energy (shorter wavelengths) and re-emits light in lower frequency energy (longer wavelengths). This process is known as "down-converting." The resultant light spectrum produced by this process can be tuned by various fluorescent dye concentrations to a multiplicity of desired colors. The resulting color gamut is defined by the blue LED and available commercial dyes included in the color converter 14.

The resultant color is achieved via the positioning, shape, and material composition of the color converter 14. Essentially, the color converter 14 may include any desirable (optically clear) material, such as a polycarbonate or acrylic-based binder that contains a diffusing acrylic, silica, polytetrafluoroethylene or glass additive and/or any desirable dye. The scattering particles may be comprised of a very fine, powder of particles or micro-spheres, which may be solid or hollow, to scatter the light within the color converter 14 to assist in the spreading and converting the color of the light. The diffusant effectively increases the path that blue photons travel through the material thickness, making the color conversion more efficient. The diffusant increases the likelihood of an interaction of a blue photon with a dye molecule. Other embodiments of the color converter 14, if desired, may only include the diffuser without a dye; in this instance, the color converter 14 would simply be a diffuser and only isotropically reorients the emitted light from the source light. Likewise, a color converter may contain only a dye (or mixture of dyes) without a diffuser. Because the blue photons will pass through this material with less dye interaction, more dye or thicker material is required to produce a color equivalent to that with a diffusant.

Figure 7:
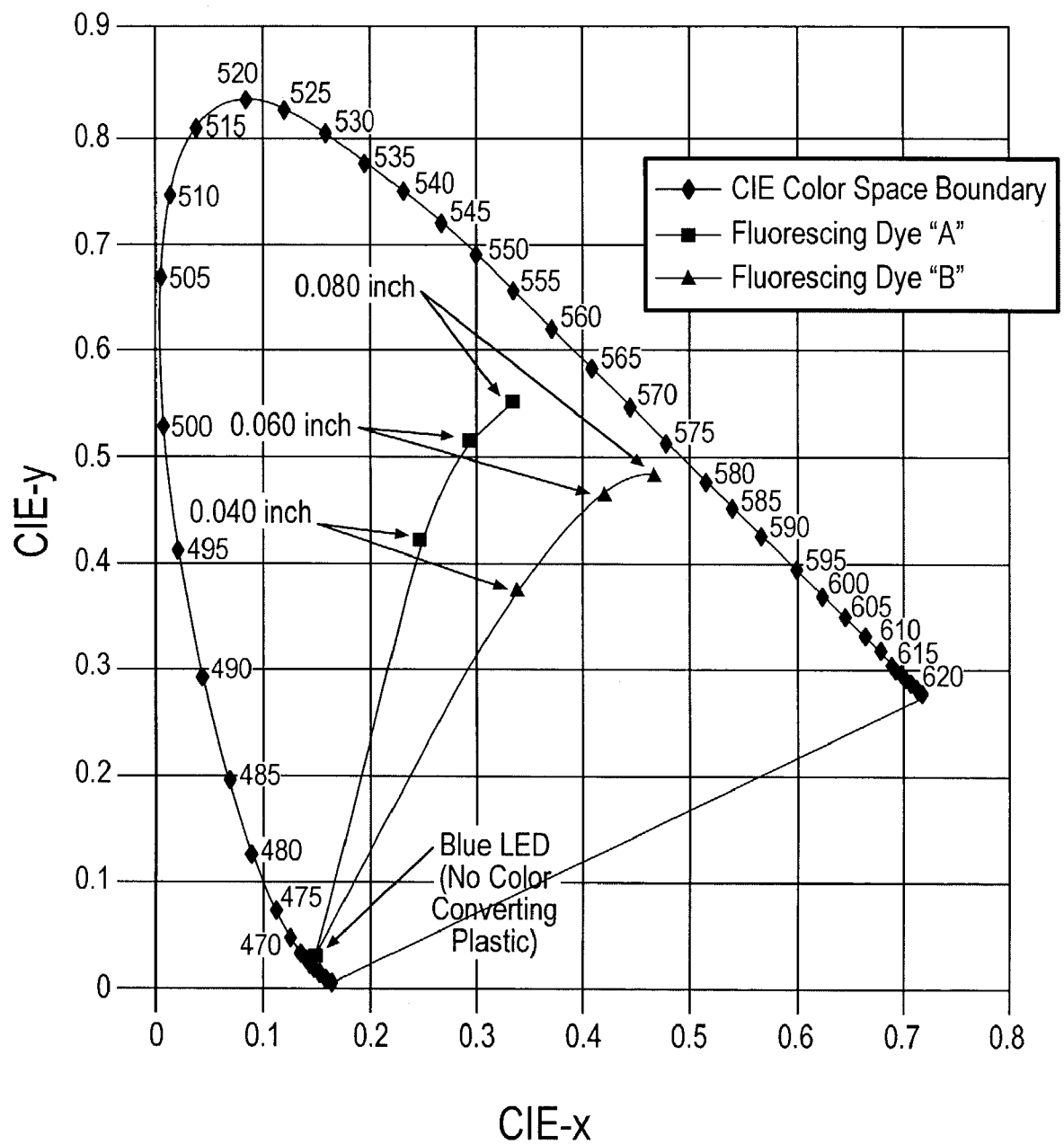
FIG. 7 is a CIE chromaticity diagram illustrating output color data points corresponding to appropriately colored plastic with dye or dyes stimulated by a reference color of a light source.

One possible dye for the color converter 14 may be selected from the BASF Lumogen (R or F) Series that allows for easy integration into the polycarbonate or acrylic. As shown in FIG. 7, a Commission International de l'Eclairage (CIE) chromaticity diagram illustrates appropriately colored dye or dyes that may be selected based on the type of reference color of the light source 36 and the desired output color for the back-lit display button, graphic, or indicia. More specifically, the CIE diagram defines all colors on a 2 dimensional x,y plot and illustrates an example of how colors may be attained by incorporating the blue LED and two particular dyes, which are generally shown at "Fluorescing Dye A" and "Fluorescing Dye B." The CIE diagram depicts the multidimensional subjective relationship among colors perceived by the normal human visual system (i.e. eyes and nervous system, including the brain) when additively stimulated by two or more, usually three discrete monochromatic visible sources (i.e. wavelengths).

When "Fluorescing Dye A" is used in varying thicknesses of plastic for the color converter 14 (e.g. 0.040", 0.060", and 0.080" thicknesses) with the blue LED, achievable colors are represented on the line from the blue LED through the data points shown. In the first example thickness at 0.040", the resultant color of the first data point is a bluish green. Additional material thickness drives the resultant color into the green region of the CIE chromaticity diagram. In another example, when "Fluorescing Dye B" is used in a likewise manner, the first data point at 0.040" is nearly white, and additional material thickness drives the color into the yellow-green area of the CIE chromaticity diagram. In another possible example, by mixing fluorescing Dyes "A" and "B," colors that fall between these lines may be achieved. It is also possible to further tune the resultant color by changing the concentration of dye in the color converting plastic.

A reduction in dye concentration for either dye "A" or "B" will direct the generated color closer to that of the blue LED, whereas increasing the dye concentration will direct the color farther away from the blue LED color. Although a blue LED is used for the light source 36 in both examples discussed above, any colored light source may used in place of the blue LED as long as the resulting converted light has a lower frequency than the stimulating light source.

As stated above, a blue-colored LED is a desirable choice for the light source 36 because blue is known to be on the lower end of the frequency spectrum of the visible light band. Other types of light, such as green, purple, or even ultra-violet light, that is higher in frequency than blue light, may be used as well; however, if an ultra-violet light source is used, the light distribution hub 10 may further comprise an additional filter, such as an ultra-violet filer that may filter ultra-violet light, which does not get converted after passing through the color converter 14 to a higher frequency color (i.e. for example, if the ultra-violet light passes through the bore 44 in the color converter 14 and out the apertures 40).

Although only one light source 36 is illustrated, more than one light source may be included in the invention. If more than one LED is included, the LEDs may comprise different colors, or alternatively, the same color. If more than one LED is included in the invention, the size of the light distribution hub 10, such as, for example, the diameters D1–D4, may have to be increased; even further, if the feeder pipe 18 is implemented in the design of the light house 12 for propagating light in the direction of the arrow, L1, over a longer length, the shape of the feeder pipe 18 may have to include a generally rectangular surface area facing the LEDs such that the feeder pipe 18 may cover the 'footprint' of the multiple LED cluster. However, it is contemplated that the use of one LED is advantageous because the use of one LED eliminates a variance in color, which may be introduced by a second LED from the same population of similar LEDs.

Figures 8A, 8B, 8C, 8D:
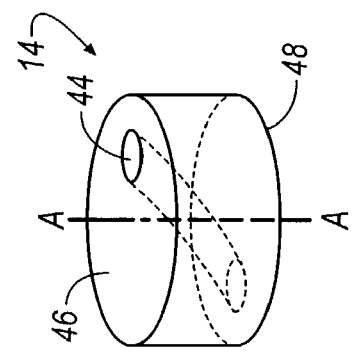
FIGS. 8A–8D are perspective views of various embodiments of a color converter that may be included in the light distribution hub accord to FIGS. 1–5.

Referring now to FIGS. 8A–8D, the color converter 14, which is shaped for insertion into the cylindrical first cavity 22 is shown generally at 14 in various alternative embodiments. As seen in FIG. 8A, a bore 44 may centrally extend through the color converter 14 from a top surface 46 to a bottom surface 48 about the axis, A. Depending on the color design of the back-lit system, which is explained in more detail with respect to FIGS. 18 and 19, the bore 44 may be selectively formed in the color converter 14 at any desirable location to achieve simultaneously generated multiple color emissions from the single colored reference LED. For example, as illustrated in FIG. 8A, because the bore 44 is centrally disposed about the axis, A, the color converter 14 generally produces only one converted color light pattern; alternatively, the bore 44 may be offset to the right (FIG. 8B) or left (FIG. 8C) of the axis, A, to produce multiple color emissions from the single-colored light source 36. Yet even further, the bore 44 may extend diagonally in a lineal direction (FIG. 8D) or in any non-lineal direction (not shown) from the top surface 46 to the bottom surface 48 to produce multiple color light patterns. Functionally, the bore 44 passes some of the original, unconverted reference light from the light source 36 to reflect off of the cap 16 and back into the color converter 14 about the first cavity 22 such that the isotropically directed light through the apertures 40 may be diffused to produce the different color than that of the reference color of the light source 36.

Positioning of the bore 44 also provides a second provision for light distribution of one or many colors from the single LED. More specifically, the bore 44 may be defined to include a cylindrical-shape having a fifth diameter, D5, that distributes light in all directions about a plane; however, as the diameter, D5, of the bore 44 is increased, the blue light passes through a thinner section of converting material, resulting in a bluer resultant color. Making diameter D5 smaller results in a thicker material section, and more complete conversion of the blue light to longer wavelengths. Also, the bore may be cylindrical, or may be multi-faceted as shown in FIGS. 8E and 8F.

Figures 8E, 8F, 8G, 8H:
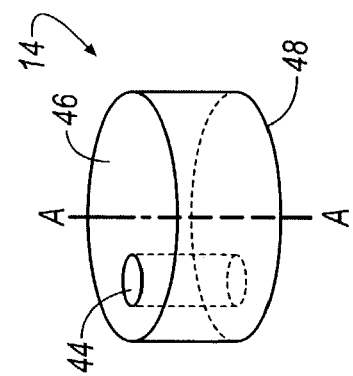
FIGS. 8E–8K are perspective views of alternate embodiments of the color converter according to FIGS. 8A–8D.
Figure 8I:
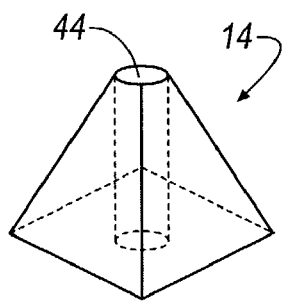
Figure 8J:
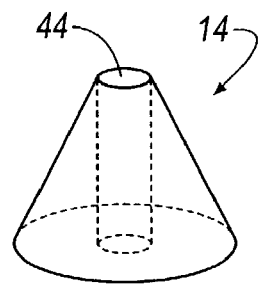
Figure 8K:
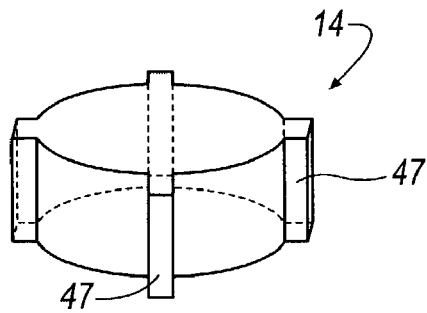

In another alternative embodiment, the color converter 14 may include a multi-faceted outer perimeter 45 and a bore that is multi-faceted (FIG. 8F) or a generally cylindrical (FIG. 8G). Other alternative embodiments of the color converter 14 may also include a general pyramid shape (FIG. 8I) or a cone shape (FIG. 8J) that reflects light on an angle. If no bore is desired (i.e. most, or all of the original reference color of the light source 36 is converted) the color converter 14 may be completely solid, as seen in FIG. 8K. If desired, any of the color converters 14 described in FIGS. 8A–8J may also include attachment features such as 'feet' or 'wings' 47 (FIG. 8K) located on its outer perimeter that may cooperate with cut-out notches (not shown) in the region of the first cavity 22 that permits the color converter 14 to be matingly received and secured by the light house 12.

Color generation and control may also be varied by increasing or decreasing the thickness, T (FIG. 8A), of the color converter 14. More specifically, if the thickness, T, is decreased to the extent that it does not cover the aperture(s) completely, the light from the light source 36 leaks around the color converter 14, resulting in a passed light having an appearance in color that is closer to the reference color of the light source 36 as a result of not passing through many dye or pigment particles. Even further, to ensure color conversion of the emitted light from the light source 36, the thickness, T, should be greater than and at least entirely cover the apertures 40 so that originally-colored light that escapes from the light house 12 is minimized. Although not required, it is preferable that the diameter, D3, of the color converter 14 is greater than the diameter, D4, of the feeder pipe 18 to prevent emitted light from the light source 36 to pass the color converter 14 between its outer periphery and the first cavity 22 and out through the apertures 40.

It should be noted that while color conversion does indeed dominate the originally emitted reference light from the light source 36, some of the originally colored reference light does pass through the color converter. However, if the diameter, D3, of the color converter 14 is greater than the feeder pipe 18 diameter, D4, and if the thickness, T, of the color converter 14 is greater than a sixth diameter, D6 (FIG. 3), of the apertures 40, and if the light house 12 is sealed against the PCB 38, most, if not all of the originally colored reference light from the light source 36 does not escape the light house 12 and taint the converted light.

Figure 9:
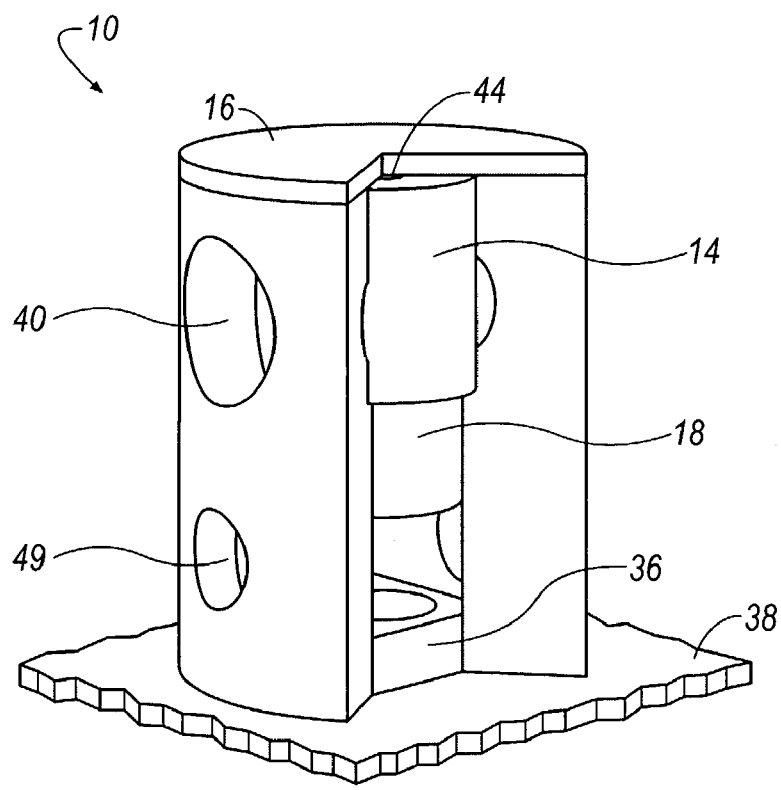
FIG. 9 is a perspective, partially cut-away, assembled view of a light distribution hub according to another embodiment of the invention including cavity apertures in the light house below a color converter.

In other situations, it may be desirable to emit originally-colored reference light from the light source 36; as seen in FIG. 9, this may be achieved by providing additional apertures 49 about the second cavity 30, which may disposed below the feeder pipe 18 and the color converter 14. Because some of the converted light may reflect off of the cap 16 and back into the second cavity 30 towards the light source 36, some of the originally-colored reference light escaping from the apertures 49 may be corrupted by the converted light. An appropriate filter that filters the converted light may be disposed between the feeder pipe 18 and the color converter 14 in the area designated at 17 (FIG. 5) to prevent corruption of the reference light emitting from the apertures 49.

Figure 10:
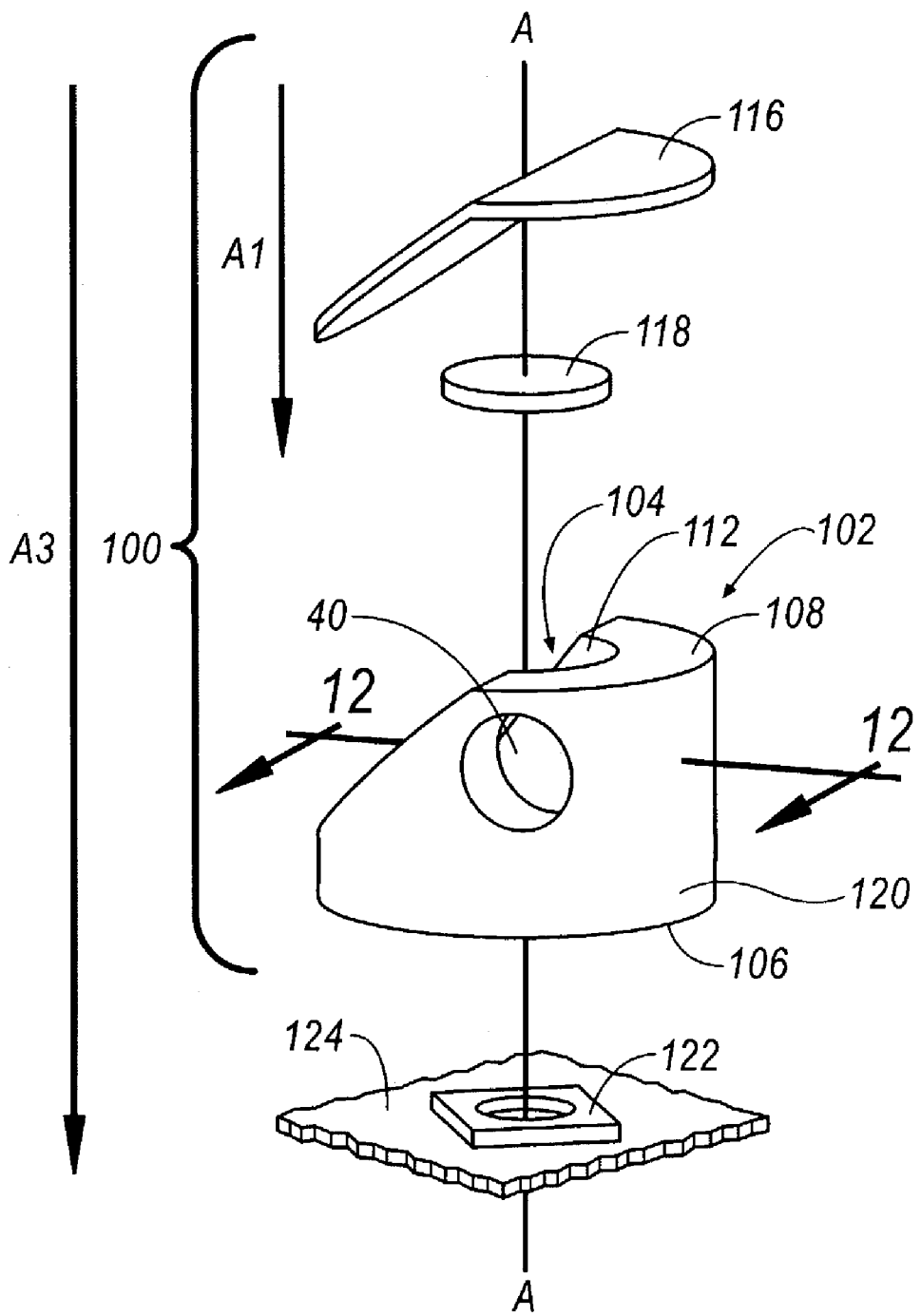
FIG. 10 is a front-perspective, exploded view of a light distribution hub according to another embodiment of the invention.
Figure 11:
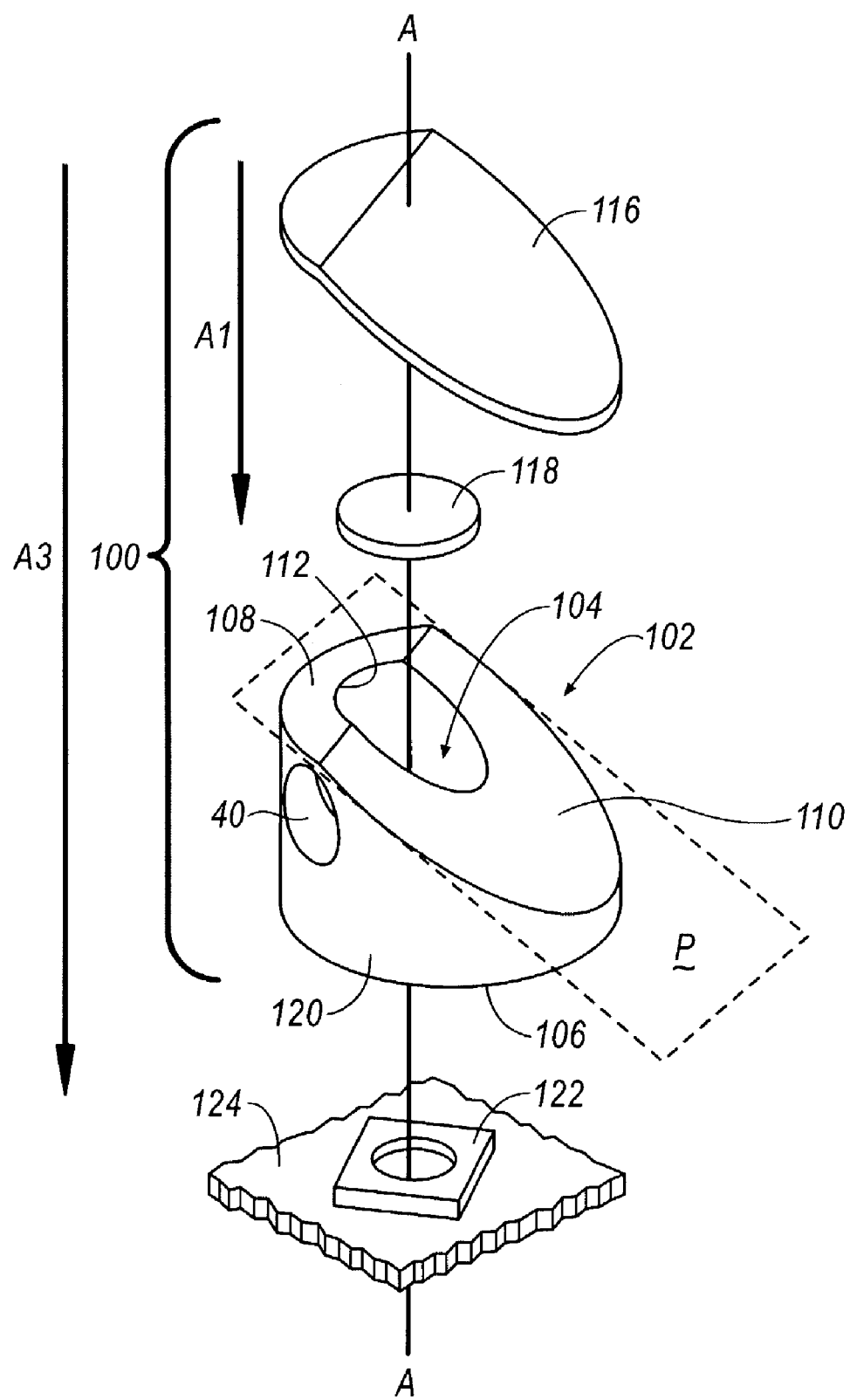
FIG. 11 is a rear-perspective, exploded view of the light distribution hub according to FIG. 10.
Figure 12:
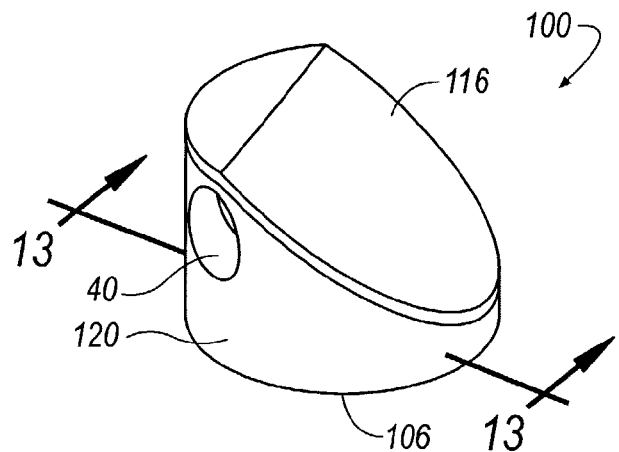
FIG. 12 is an assembled view of the light distribution hub according to FIGS. 10–11.
Figure 13:
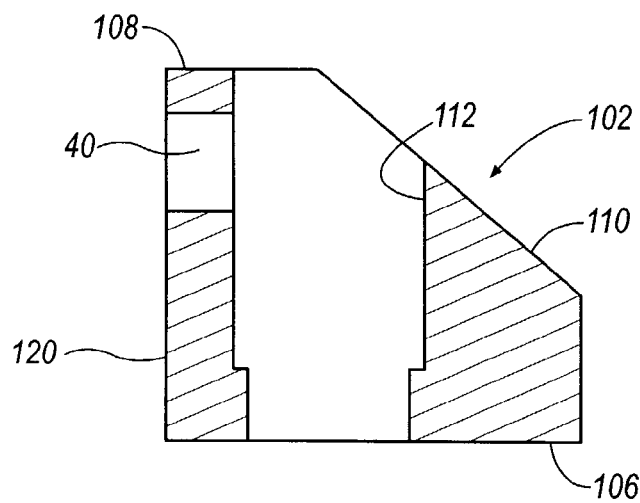
FIG. 13 is a cross-sectional view of a light house according to FIG. 10.

Another embodiment of the light distribution hub, as seen in FIGS. 10–14 at reference numeral 100, may include a non-cylindrical or non-spherical shaped light house 102 and cavity 104. More specifically, the cavity 104 extends cylindrically from a bottom surface 106 towards a top surface 108 about the axis, A; however, it is important to note that the light house 102 is beveled about an inclined surface 110 that diagonally extends through the cavity 104 about a plane, P (FIG. 11).

Figure 14:
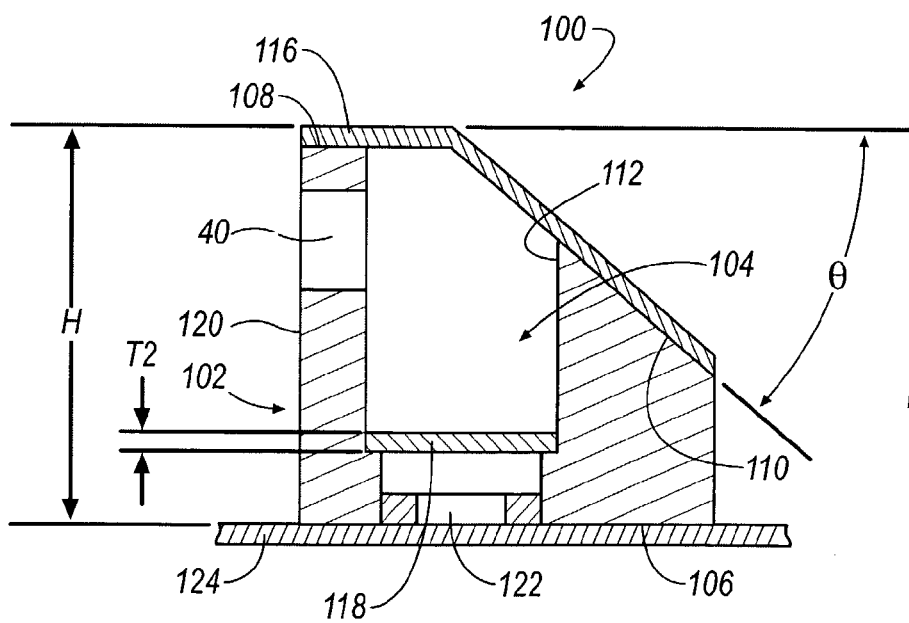
FIG. 14 is a cross-sectional view of the light distribution hub according to FIG. 12.

The shape of the light house 102 provides a, low loss distribution of light. As seen in FIG. 14, because the surface area of the inner perimeter 112 of the cavity 104 is reduced, light is directed efficiently towards aperture 40. The low loss directed distribution provides a limited distribution of light from apertures 40 which is, for the most part, re-directed off of the cap 116 of the light distribution hub. Essentially, the light house 102 and reflective cap 116 may be chamfered at any desirable angle, θ, such as, for example, a 45-degree angle that forces the light to be redirected in a controlled fashion by the laws of reflection.

In this embodiment of the invention, the light distribution hub 100 is defined by the height, H. As compared to the illustrated embodiment of the light distribution hub 10, the light distribution hub 100 is relatively shallow in height, H, and includes a relatively thin, film-like color converter 118 having a thickness, T2, that is less than the thickness, T, of the color converter 14. The light distribution hub 100 includes many of the same provisions of the light distribution hub 10 in that the apertures 40 are disposed radially about an outer perimeter 120 of the light house 102 and that the color converter 118 is inserted in a direction indicated by the arrow, A1 (FIGS. 10 and 11), such that the light distribution hub 100 is inserted about a light source 122 secured to a PCB 124 in the direction indicated by the arrow, A3. The light house 102 may have any desirable shape or amount or location of apertures 40 described above, and may also incorporate the various shapes of the color converters illustrated in FIGS. 8A–8K rather than the thin color converter 118. Although an insertion of the color converter 118 is illustrated in FIGS. 10 and 11, the color converter 118 may be in-molded to a one-piece light house and cap as described above as well.

Figure 17:
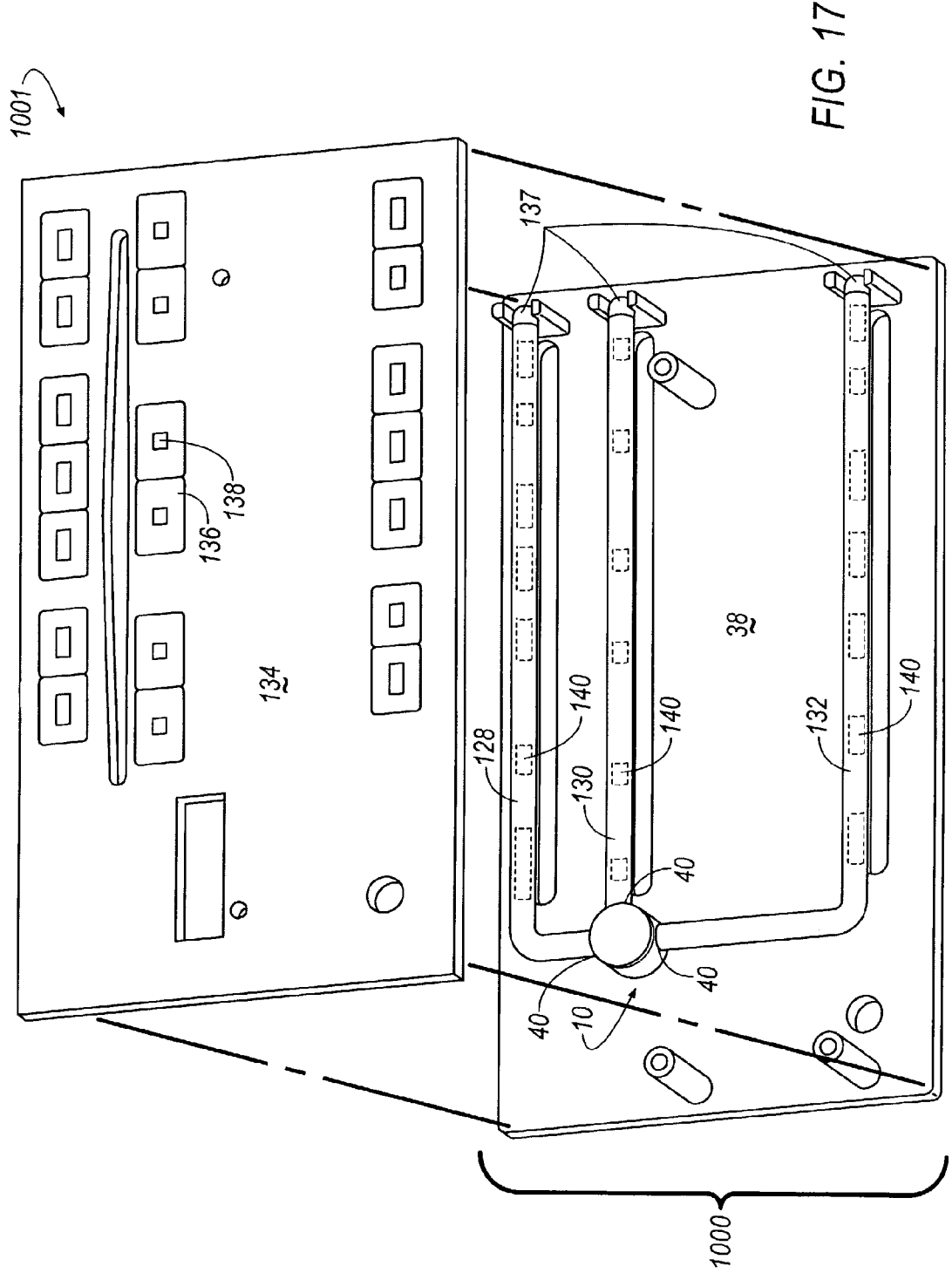
FIG. 17 is a top-perspective, exploded view of a light distribution system according to another embodiment of the invention including a back-lit button panel.

As seen in FIGS. 15–17, a light distribution pipe 126 may extend from the apertures 40 to distribute light for a back-lit panel. As seen in FIGS. 15 and 16, the light distribution pipe 126 may comprise a continuous loop that extends from and connects the apertures 40 of the light distribution hub 100; alternatively, as illustrated in FIG. 17, individual light distribution pipes 128, 130, 132 may extend from individual apertures in a lineal-disposed pattern. According to the illustrated embodiment of FIG. 17, a back-lit panel 134 includes a plurality of buttons 136 with graphics or indicia 138 that may be illuminated by the light distribution system 1000.

Light is directed from the light pipes 128, 130, 132 in a direction towards the buttons 136 by either abrading the surface of the light pipes 128, 130, 132 or by applying a thin strip of reflective paint to form 'light decouplers' 140. More specifically, the abrasion or application of paint is applied to the underside surface of the light pipe 128, 130, 132 in opposing relationship to a graphic or indicia 138. Because light is decoupled continuously from the pipe 128, 130, 132 due to surface imperfections and light decouplers 140, graphics or indicia 138 close to the light distribution hub 100 will have a greater luminance than those farther away from the light distribution hub 100. If even illumination of graphics or indicia 138 is needed, the light decouplers 140 may need to be extended or retracted about the circumference of the light pipe 128, 130, 132. Extending the light decoupler 140 about the circumference of the light pipe 128, 130, 132 serves to increase the amount of light decoupled, whereas retracting the light decouplers 140 serves to reduce the amount of light decoupled. Appropriate selection of this parameter for each graphic or indicia 138 allows the luminance of each button 136 to be balanced to each other. Also, the light decouplers 140 are formed to include a length that is consistent to the length of the illuminated graphic or indicia 136. Even further, reflective material 137 may be located at an end of the light pipe 128, 130, 132 to provide a recycling of the light. If abrasion of the light pipes 128, 130, 132 is preferred over painting, any desirable abrasion technique may be applied, such as a sandblasting process. To avoid a secondary operation, a texture pattern may also be applied to the light pipe mold in the area where light decouplers 140 are desired.

As seen in FIGS. 18 and 19, a partially exposed, top view of the light distribution hub 10, as applied to the light distribution system 1000 in FIG. 17 is presented. FIG. 18 generally illustrates the color converter 14 as shown in FIG. 8A, which includes the bore 44 centrally located about the thickness, T, of the color converter 14. If a blue light source is used and a yellow dye is included in the material composition of the color converter 14, light-pipes 128, 130, 132 will all produce the same bluish-green-colored light, which is indicated by the letter, G. However, as seen in FIG. 19, if the same blue light is used for source 36 and material composition including a yellow dye is used for the color converter 14, offsetting the bore 44 to the right will cause the lightpipe 130, in the middle, to emit a bluer light, indicated by the letter, B, and light pipes 128, 132, at the top and bottom, will tend to emit a greener-colored light, indicated by the letter, G.

Accordingly, the present invention provides a low-loss distribution of light. The light emission is controlled with respect to direction and color from a reference color light source for a plurality of buttons 136, graphic, or indicia 138 of a back-lit component while permitting a down conversion of power for the reference color light source, which generates different colored visible light than that emitted from the single reference light source.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A light distribution apparatus, comprising:
a light distribution hub, wherein the light distribution hub includes:
at least one light source that provides reference color light wavelength emission,
a light house positioned over the light source to control and distribute the light wavelength emission,
a color converter positioned in a cavity of the light house to convert at least part of the light wavelength emission into a converted light of a different color light wavelength emission, at least one aperture located about an outer perimeter of the light house that permits distribution of the converted light,
wherein the light distribution hub further comprises an acrylic light feeder pipe, and
wherein the color converter includes a bore that facilitates color conversion of the reference color light wavelength emission.

2. The light distribution apparatus of claim 1, wherein the light feeder pipe may further comprise a convex collimating lens opposing the light source.

3. The light distribution apparatus of claim 1, wherein the light house includes an opaque reflective plastic material that recycles light that is not passed through the apertures.

4. The light distribution apparatus of claim 1, wherein the light source is a light emitting diode that produces the wavelength emission, wherein the wavelength emission includes at least one selected from the group consisting of blue, green, purple, and ultra-violet light.

5. The light distribution apparatus of claim 1, wherein the bore is centrally disposed about a central axis, A, and extends from a top to bottom surface of the color converter.

6. The light distribution apparatus of claim 1, wherein the bore is offset to the left or right of a central axis, A, and extends from a top to bottom surface of the color converter.

7. The light distribution apparatus of claim 1, wherein the bore is diagonally disposed in reference to a central axis, A, and extends from a top to bottom surface of the color converter.

8. The light distribution apparatus of claim 1, where the bore includes a cylindrical shape.

9. The light distribution apparatus of claim 1, wherein the bore includes a multi-faceted shape.

10. The light distribution apparatus of claim 1, wherein the color converter includes one selected form the group consisting of a cylindrical outer perimeter, a multi-faceted outer surface, a pyramid-shaped outer surface, a cone-shaped outer surface, and a spherical-shaped outer surface.

11. The light distribution apparatus of claim 1, wherein the light house and cavity are non-cylindrically-shaped and provides a low loss, limited distribution of light from the apertures.

12. The light distribution apparatus of claim 1, wherein the color converter includes uniform thickness that facilitates color conversion of the reference color light wavelength emission.

13. The light distribution apparatus of claim 1, wherein at least one light distribution pipe extends from the apertures to distribute light for a back-lit panel including a plurality of buttons with graphics or indicia.

14. The light distribution apparatus of claim 13, wherein the light distribution pipe extends linearly from the aperture.

15. The light distribution apparatus of claim 13, wherein the light distribution pipe includes light decouplers that direct light towards back-lit panel.

16. The light distribution apparatus of claim 1, wherein the cavity comprises a first cavity located in an upper portion of the light house and a second cavity located in a lower portion of the light house.

17. The light distribution apparatus of claim 16, wherein the color converter is positioned about the first cavity and the feeder pipe is positioned about the second cavity.

18. The light distribution apparatus of claim 16, wherein the first cavity includes a first diameter that is greater than a second diameter of the second cavity, wherein the color converter includes a third diameter that is greater than a fourth diameter of the feeder pipe.

19. The light distribution apparatus of claim 16, wherein the color converter is positioned about the second cavity.

20. The light distribution apparatus of claim 16, wherein the color converter includes attachment features located on its outer perimeter that is matingly-received and cooperates with the first cavity.

21. The light distribution apparatus of claim 16, wherein the color converter contacts an inner bore surface of the first cavity.

22. The light distribution apparatus of claim 21, wherein the light distribution hub may further comprise a cap including an opaque reflective plastic material that is positioned on a top surface of the light distribution hub for sealing the first cavity.

23. The light distribution apparatus of claim 16, wherein the light house is cylindrically-shaped and provides light in a multiplicity of directions from the apertures.

24. The light distribution apparatus of claim 23, wherein the first and second cavities include a cylindrical shape.

25. The light distribution apparatus of claim 23, wherein the second cavity includes a cylindrical shape and the first cavity includes a spherical shape that enables distribution of light in three dimensions.

26. The light distribution apparatus of claim 16, wherein the apertures are disposed about the first cavity in a first common plane.

27. The light distribution apparatus of claim 26, wherein additional apertures are disposed about the first cavity in uncommon planes.

28. The light distribution apparatus of claim 26, wherein additional apertures are disposed about the second cavity in a second common plane.

29. The light distribution apparatus of claim 16, wherein the light source is a light emitting diode attached to a printed circuit board, wherein the surface of the printed circuit board further comprises a reflective film or paint over an area bounded by the second cavity.

30. The light distribution apparatus of claim 29, wherein the light house further comprises attachment features.

31. The light distribution apparatus of claim 30, wherein the attachment features are spears extending from a bottom surface of the light house that contacts the printed circuit board.

32. A method of providing a low loss distribution of light comprising the steps of:
providing at least one light distribution hub including:
providing a light distribution apparatus that includes a light house,
positioning a color converter about a cavity in the light house,
positioning the light house over at least one light source, providing a reference color light supplied from the at least one light source, emitting reference color light from the light source, converting at least part of the light wave length emission of the reference color light to a converted color light of a different color light wavelength emission, distributing converted light from at least one aperture located about an outer perimeter of the light house, and providing a bore in the color converter that facilitates color conversion of the reference color light emission.

33. The method according to claim 32, further comprising the step of positioning an acrylic light feeder pipe in the light house in opposing relationship to the light source.

34. The method according to claim 32, further comprising the step of positioning a cap including an opaque reflective plastic material on a top surface of the light distribution hub for sealing the first cavity.

35. The method according to claim 32, further comprising the step of positioning the light source on a printed circuit board, and providing a reflective film or paint on the printed circuit board bounded by the region of the cavity.

36. The method according to claim 32, wherein the acrylic light feeder pipe includes a convex collimating lens at an end of the light pipe that opposes the light source.

37. The method according to claim 32, further comprising the step of centrally positioning the bore about a central axis, A, and extending the bore from a top to bottom surface of the color converter.

38. The method according to claim 32, further comprising the step of offsetting the position of the bore to the left or right of a central axis, A, and extending the bore from a top to bottom surface of the color converter.

39. The method according to claim 32, further comprising the step of positioning the bore diagonally in reference to a central axis, A, and extending the bore from a top to bottom surface of the color converter.

40. The method according to claim 32, further comprising the step of substituting the color converter with a light diffuser to reorient the light from the light source.

41. The method according to claim 32, further comprising the step of providing uniform thickness of the color converter that facilitates color conversion of the reference color light.

42. The method according to claim 32, further comprising the step of extending at least one light distribution pipe from the apertures and distributing light for a back-lit panel including a plurality of buttons with graphics or indicia.

43. The method according to claim 42, further comprising the step of extending the light distribution pipe linearly from the aperture from the light house.

44. The method according to claim 42, further comprising the step of providing light decouplers about the light distribution pipe for directing light towards a back-lit panel.

45. A light distribution apparatus, comprising:
a light distribution hub, wherein the light distribution hub includes
at least one light source that provides reference color light wavelength emission,
a light house positioned over the light source to control and distribute the light wavelength emission,
a color converter positioned in a cavity of the light house to convert at least part of the light wavelength emission into a converted light of a different color light wavelength emission, and
at least one aperture located about an outer perimeter of the light house that permits distribution of the converted light,
wherein the light source is a light emitting diode that produces the wavelength emission, wherein the wavelength emission includes at least one selected from the group consisting of blue, green, purple, and ultra-violet light, and
wherein the color converter comprises an optically clear polycarbonate or acrylic-based binder that contains at least one of the group consisting of a diffusing acrylic, silica, polytetrafluoroethylene and glass additive and at least one dye, wherein the wavelength emission fluoresces the dye to cause color conversion.

46. The light distribution apparatus of claim 45, further comprising a diffuser including a very fine powder of micro-spheres or particles that increases the path of the blue, purple, or ultra-violet light and facilitates interaction of the blue, purple, or ultra-violet light with the dye.

47. A light distribution apparatus, comprising:
a light distribution hub, wherein the light distribution hub includes
at least one light source that provides reference color light wavelength emission,
a light house positioned over the light source to control and distribute the light wavelength emission,
a color converter positioned in a cavity of the light house to convert at least part of the light wavelength emission into a converted light of a different color light wavelength emission, and
at least one aperture located about an outer perimeter of the light house that permits distribution of the converted light,
wherein the light house and cavity are non-cylindrically-shaped and provides a low loss, limited distribution of light from the apertures, and
wherein the light house is beveled about an inclined surface that diagonally extends through the cavity about a plane.

48. The light distribution apparatus of claim 47, wherein the light distribution hub may further comprise a cap including an opaque reflective plastic material that is positioned on a top surface of the light distribution hub for sealing the first cavity, wherein the cap is chamfered at an angle, $\theta$, that forces the light to be redirected and reflected in a controlled fashion toward an aperture.

49. A light distribution apparatus, comprising:
a light distribution hub, wherein the light distribution hub includes
at least one light source that provides reference color light wavelength emission,
a light house positioned over the light source to control and distribute the light wavelength emission,
a color converter positioned in a cavity of the light house, wherein the color converter includes a bore, and
at least one aperture located about an outer perimeter of the light house that permits distribution of the converted light.

50. A light distribution apparatus, comprising:
a light distribution hub, wherein the light distribution hub includes
at least one light source that provides reference color light wavelength emission,
a light house positioned over the light source to control and distribute the light wavelength emission,
a color converter positioned in a cavity of the light house to convert at least part of the light wavelength emission into a converted light of a different color light wavelength emission, and at least one aperture located about an outer perimeter of the light house that permits distribution of the converted light, wherein at least one light distribution pipe extends from the apertures to distribute light for a back-lit panel including a plurality of buttons with graphics or indicia, and wherein the light distribution pipe extends in a continuous loop from a first aperture of the light house to a second aperture of the light house.

51. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, distributing converted light from at least one aperture located about an outer perimeter of the light house, extending at least one light distribution pipe from the apertures and distributing light for a back-lit panel including a plurality of buttons with graphics or indicia, and extending the light distribution pipe in a continuous loop from a first aperture of the light house to a second aperture of the light house.

52. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, distributing converted light from at least one aperture located about an outer perimeter of the light house, extending at least one light distribution pipe from the apertures and distributing light for a back-lit panel including a plurality of buttons with graphics or indicia, and extending the light distribution pipe from an aperture of a first light house to an aperture of a second light house.

53. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, distributing converted light from at least one aperture located about an outer perimeter of the light house, extending at least one light distribution pipe from the apertures and distributing light for a back-lit panel including a plurality of buttons with graphics or indicia, and providing light decouplers about the light distribution pipe for directing light towards a back-lit panel, wherein the light decouplers are formed about the circumference of the light distribution pipe to provide even illumination to corresponding buttons.

54. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, and distributing converted light from at least one aperture located about an outer perimeter of the light house, extending at least one light distribution pipe from the apertures and distributing light for a back-lit panel including a plurality of buttons with graphics or indicia, and providing light decouplers about the light distribution pipe for directing light towards a back-lit panel, wherein reflective material is located at an end of the light pipe to provide a recycling of the light.

55. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, and distributing converted light from at least one aperture located about an outer perimeter of the light house, wherein the distributing step includes the step of distributing non-converted source light from another aperture axially located below the color converter that is positioned about an outer perimeter of the light house.

56. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, distributing converted light from at least one aperture located about an outer perimeter of the light house, and including attachment features located on the outer perimeter of the color converter and matingly receiving the color converter in the cavity.

57. A method of providing a low loss distribution of light comprising the steps of:

providing at least one light distribution hub including:

providing a light distribution apparatus that includes a light house, positioning a color converter about a cavity in the light house, positioning the light house over at least one light source, providing a reference color light supplied from the at least one light source, emitting reference color light from the light source, converting at least part of the light wave length emission of the reference color light to a converted color light of a different color light wavelength emission, distributing converted light from at least one aperture located about an outer perimeter of the light house, and beveling the light house about an inclined surface that diagonally extends through the cavity about a plane.

* * * * *